(12) United States Patent
Jacobs et al.

(10) Patent No.: US 6,412,981 B1
(45) Date of Patent: Jul. 2, 2002

(54) SEAL ARRANGEMENT FOR A LOAD-CARRYING BEARING, PARTICULARLY FOR COORDINATE MEASURING DEVICES

(75) Inventors: Klaus Jacobs, Koenigsbronn-Ochsenberg; Volker Piwek, Aalen; Franz Woletz, Essingen; Ralf Bernhardt, Aalen, all of (DE)

(73) Assignee: Carl-Zeiss-Stiftung, Oberkochen (DE)

( * ) Notice: Subject to any disclaimer, the term of this patent is extended or adjusted under 35 U.S.C. 154(b) by 0 days.

(21) Appl. No.: 09/534,064

(22) Filed: Mar. 24, 2000

(30) Foreign Application Priority Data

May 5, 1999 (DE) .......................... 199 20 740

(51) Int. Cl.[7] .............................................. F16C 33/80
(52) U.S. Cl. ........................................................ 384/15
(58) Field of Search ........................ 384/15, 16, 144, 384/480

(56) References Cited

U.S. PATENT DOCUMENTS 5,871,283 A * 2/1999 Isobe et al. ................ 384/15
6,030,124 A * 2/2000 Moseberg et al. .......... 384/15

* cited by examiner

Primary Examiner—Lenard A. Footland
(74) Attorney, Agent, or Firm—Reed Smith LLP

(57) ABSTRACT

In a seal arrangement for a load-carrying bearing which is supported on a guide path provided on a carrying body and which is arranged so as to be movable along the length of the guide path, especially for coordinate measuring devices, the bearing is connected with a bearing cover. The bearing cover spans the carrying body at least on one side thereof and has a side portion which is bent toward its side, each side portion projecting into a labyrinth recess which is arranged on the associated side of the carrying body over the entire length of the guide path to form a labyrinth seal.

13 Claims, 3 Drawing Sheets

SEAL ARRANGEMENT FOR A LOAD-CARRYING BEARING, PARTICULARLY FOR COORDINATE MEASURING DEVICES

BACKGROUND OF THE INVENTION a) Field of the Invention

The invention relates to a seal arrangement for a load-carrying bearing which is supported on a guide path provided on a carrying body and which is arranged so as to be movable along the length of the guide path, especially for coordinate measuring devices.

b) Description of the Related Art

Load-carrying bearings which are supported on guide paths that are arranged on carrying bodies and which are movable along these guide paths are used in many areas of technology, e.g., for supporting movable machine tables for machine tools or as supporting bearings for bridges or portals in coordinate measuring devices.

The simplest construction of bearings of the type mentioned above consists in that the bearing in question is only supported so as to be movable on the associated guide path without any special sealing devices being provided in order to prevent penetration by dirt, floating particles, aerosols, moisture, or the like, into the bearing surface. Such arrangements are possible when requirements with respect to the insensitivity of the guide elements to dirt are relatively undemanding or when the device in question operates in a suitable cleanroom.

However, devices of the type mentioned above are increasingly used in manufacturing environments, i.e., the machines are no longer set up in closed, air-conditioned rooms and halls which are protected from access by manufacturing media, but rather in rooms and halls used for manufacturing, so that there is a risk that all of the contaminants and the like which are present in such manufacturing halls will lead to impairment of the guide paths and therefore to impaired quality of the bearing surfaces. This is especially undesirable when the machines in question are high-precision measurement devices in which such influences must be eliminated.

Accordingly, a seal arrangement has already been provided in coordinate measuring devices for sealing bearings of the kind mentioned above. In this seal arrangement, the guide path and the bearing supported on the guide path are covered by a box-shaped cover plate, on whose side opposite to the guide path is formed a central longitudinal slot through which is guided a connection element which connects the bearing with a structure to be supported located outside of the cover plate. Within the space enclosed by the cover plate, near the longitudinal slot, this connection element has a wide guide body which extends on both sides along the lateral edges of the longitudinal slot and which (seen in the longitudinal direction of the longitudinal slot) is penetrated by a through-opening. A cover strip, whose shape is adapted to the through-opening and which extends inside the cover plate along its entire length, runs through this through-opening and serves to cover the longitudinal slot on the inner side of the cover plate. This cover strip, whose width also projects over the sides of the longitudinal slot, is fastened in a suitable manner at both of its ends. Since the cover strip runs through the through-opening of the guide body, the bearing can be moved along the strip with the connection element coupled to it and the structure to be supported which is connected with the latter, so that the longitudinal movement required for the bearing is ensured, but the cover strip still conceals the open longitudinal slot opposite to the inner side of the cover plate at all times in the areas outside of the bearing. Since the cover strip is arranged at a distance from the longitudinal slot of the cover plate because of the overall construction, even though this distance is only slight, a certain sealing can accordingly be provided against penetration of dirt, dust and the like, but the existing gaps are relatively large, so that there is still no guarantee of a particularly good sealing action against contamination of the guide elements or penetration of floating particles.

In another known structural solution, a bellows is connected to each side of the bearing (in its movement direction) and, as seal protection, covers the portion of the guide path on the bearing side that is not covered by the bearing. However, the cost of the encapsulation required for this purpose by means of the bellows over the entire length and width of the guide surface is considerable, and the forces to be applied for the displacement of the bellows are not conducive to the absence of forces which is desired as far as possible in the longitudinal displacement of the utilized bearing.

OBJECT AND SUMMARY OF THE INVENTION

On this basis, the primary object of the invention is to provide an improved seal arrangement which ensures a particularly low susceptibility on the part of the guide elements to soiling and improved protection against the penetration of floating particles, aerosols and moisture while simultaneously providing a good overall static and dynamic characteristic of the moving system.

According to the invention, this object is achieved in a seal arrangement of the type mentioned above in that the bearing is connected with a bearing cover that spans the carrying body at least on one side thereof and that has a side portion which is bent toward its side, each side portion projecting into a labyrinth recess which is arranged on the associated side of the carrying body over the entire length of the guide path to form a labyrinth seal.

The seal arrangement proposed according to the invention results in a remarkably good sealing of the bearing relative to the external surroundings in which a manufacturing atmosphere exists, and even exacting guideline values concerning insensitivity to soiling can easily be met. At the same time, a superior protection is provided against the penetration of floating particles, aerosols and moisture and the overall construction also leads to good static and dynamic overall characteristics of the moving bearing system.

The sealing arrangement according to the invention can also easily be varied with respect to installation position: installation can accordingly be carried out vertically, horizontally or in some other defined position without substantially impairing the sealing action. At the same time, the sealing arrangement according to the invention allows an economical configuration with a modular construction in the manner of a building block system; such modular components for a building block system are, for example, the bearing cover with its side portions which are bent at both sides and the body forming the labyrinth recess, along with the carrying body with guide path and the bearing itself.

The seal arrangement according to the invention also has a total configuration with easily assembled and service-friendly joints, which is especially advantageous for cleaning within regulation maintenance intervals.

If floating particles and aerosols enter the labyrinth seal from outside the bearing in the sealing arrangement according to the invention, they are slowed down with respect to flow velocity on their way through the labyrinth seal already in the first arm of the labyrinth, so that the heavier particles settle on the bottom of the labyrinth recess during the following labyrinth deflection and when entering the other labyrinth arm running in the opposite direction. This effect is particularly important when the seal arrangement according to the invention is installed in such a way that the labyrinth channels extend substantially vertically, so that the gravitational force within the latter also acts on the entering dirt particles in the same direction. In connection with the 180-degree deflection of the labyrinth channels, the precipitating effect of dirt or residual dirt is very good. The very long and very narrow winding flow channels within the labyrinth seal not only provide for an extremely long flow path, but also for a strong deceleration of the occurring flow velocities, especially with respect to the very narrow channel cross sections in which there are considerable wall friction losses in the case of a gas flowing therein.

A particular advantage of the sealing arrangement according to the invention also consists in that it works in an entirely contact-free manner and no additional expenditure of force is required apart from the force required for the displacement of the bearing during a movement of the bearing. The seal arrangement according to the invention can be assembled and disassembled comparatively quickly, which is especially advantageous when carrying out maintenance work. In addition, dirt and dust particles or the like which may have settled in the winding paths of the labyrinth seal can also be removed quickly and easily after disassembling.

A particularly advantageous construction of the seal arrangement according to the invention consists in that the utilized bearing is constructed as an air bearing. In this way, a bearing/seal unit working in a noncontacting manner can be produced, which is particularly advantageous precisely with machines such as coordinate measuring devices which operate with very high precision because no friction forces need to be overcome in the adjusting movement in spite of the seal. In cases where this aspect is not so important, the utilized bearing can, of course, also easily be constructed in any other suitable form of bearing, e.g., as a rolling bearing or in exceptional cases even as a sliding bearing.

In another advantageous construction of the invention, the side surfaces of the carrying body on which the guide path is arranged and the bent side portion(s) of the bearing cover extend(s) essentially at right angles to the surface of the guide path. The space requirement for the seal arrangement according to the invention lateral to the course of the guide path is minimized in this way. However, in special cases of use it can also be advantageous when the side surfaces of the carrying body extend diagonally and not at right angles to the plane of the guide path, in which case the bent side portion(s) of the bearing cover should also preferably have a corresponding alignment.

An especially advantageous and effective construction of the seal arrangement according to the invention can be achieved in that the bent side portion, or every bent side portion, of the bearing cover has a construction that is U-shaped in cross section by which it projects into the associated labyrinth recess, wherein the arrangement is preferably carried out in such a way that the closed end of the U-shaped cross section of a side portion of this type is located inside of the labyrinth seal, i.e., the open side of the U-shaped cross section is directed out of the labyrinth recess. Since a U-shaped side leg projects into the U-shaped labyrinth recess in this case, a particularly long flow path is achieved inside the labyrinth seal and a right-angle deflection therefore takes place twice, namely, at the two end edges of the middle leg of the U-shaped side portion. In this case, a dirt precipitation area is created within the winding course of the flow cross section in this labyrinth seal between the two middle legs of the two U-shaped cross sections which are located one inside the other, wherein, in another preferred embodiment of the invention in which the labyrinth channels extend essentially vertically outside of the cleaning area, all of the heavier particles can settle specifically in this dirt precipitation area due to the gravitational force acting on the particles in the channels in addition to the deflection. This enables a simple and fast cleaning for maintenance purposes, wherein the bottoms of the labyrinth recess in all areas lying outside of the precise location of the bearing are easily accessible.

When the bent side portion(s) also has/have a construction which is U-shaped in cross section and lies/lie with the middle web of its/their U-shaped cross section in the labyrinth recess, another especially preferred construction of the invention consists in that the guide path is covered along its entire length by a guide path cover which is U-shaped in cross section and which likewise covers the bearing cover and its side portion(s) and projects into the recess of the U-shaped cross section of the associated side portion of the bearing cover in the area of the bearing with its side leg or with each of their side legs, wherein the lateral outside leg of the U-shaped cross section of the side portion or of each side portion is lengthened beyond the level of the position of the middle leg of the U-shaped guide path cover and is connected in that location with a structure which is to be supported by the bearing. This results in a construction of the sealing arrangement according to the invention which, in addition to a superior sealing action in spite of the guide path cover completely covering the guide path and in spite of the arrangement of the bearing inside of the area covered by the guide path cover, makes possible a problem-free supporting of the structure (such as a bridge or a portal of a coordinate measuring device) which is to be supported and which is located outside of the seal arrangement. In this advantageous construction of the invention, the forces to be supported via the bearing by the structure to be supported are transmitted to this bearing in such a way that the bearing cover is used as a force-transmitting element between them which, due to its U-shaped construction, can engage around the lower ends of the guide path cover so as to reach the inner side of the guide path cover from its outer side and accordingly so as to produce a connection from the outside supported structure to the bearing. The various parts which engage one inside the other act together to effect an excellent sealing toward the outside; at the same time, because of the selected shape of the guide path cover, it is possible for force to be transmitted from the structure to be supported which is located outside of the guide path cover to the supporting bearing inside of the guide path cover without problems. Particularly remarkable in this respect is the constructive method used for this purpose which consists in simultaneously using the bearing cover as a connection part for transmitting forces toward the structure to be supported, apart from its function for covering and forming the labyrinth seal.

The labyrinth recesses can be formed or arranged in any suitable manner at the carrying body lateral to the guide path. However, it is especially preferable that every labyrinth recess is formed of a shaped section which is arranged at the side of the carrying body and which is advantageously attached to a machine base body to which the carrying body can also be attached simultaneously. In this way, a fixed connection is provided between the shaped section and the carrying body, but without the two parts being fastened to one another directly, so that, if necessary, the shaped section can also be modified with respect to its orientation relative to the carrying body during assembly.

In the embodiments of the seal arrangement according to the invention which were described above, it is especially preferable that the labyrinth recess formed by the shaped section is lengthened on its side remote of the carrying body beyond the free end of the outside leg of the side portion engaging therein, specifically, to the extent that it projects beyond the fastening point between the side portion and the structure to be supported and is provided at its end with an end region which is bent toward the structure to be supported by the bearing. When this end region projects far enough to reach into the vicinity of the sides of the structure to be supported which face it, but does not touch these sides, yet another covering can be achieved in the bearing portion above the location where the structure to be supported is fastened to the outside leg of the side portion of the bearing cover, so that the sealing action of the seal arrangement is further improved.

Like the shaped section for forming the labyrinth recess, the bearing cover can likewise be constructed in any suitable shape and can also be formed from a plurality of individual parts which are connected with one another. It is particularly preferable, however, when the bearing cover with its side portion(s) and/or the shaped section are formed in one piece from a sheet metal shape which can then also be used as a modular structural component and can be produced in a comparatively simple manner. In this way, assembly is also facilitated on the whole and, particularly with the one-piece construction of the bearing cover with the side portion(s), a particularly good transmission of force is achieved between the bearing and the structure to be supported.

Another preferred construction of the sealing arrangement according to the invention also consists in that the shaped section forming the labyrinth recess has, on its side facing the carrying body, a side leg which is essentially parallel to the side surface of the carrying body and which extends in the direction of the guide path but ends at a distance before the position level of the latter, wherein, likewise preferably, the shaped section contacts the side surface of the carrying body facing it by its side leg. In this way, even if a small portion of residual dirt should actually pass through the labyrinth channel formed between this side leg of the shaped section and the associated side portion of the bearing cover, it will settle behind it in the stretch of channel formed between the side surface of the carrying body and the side surface of the side portion of the bearing cover facing this first side surface (before reaching the surface of the carrying body on which the guide path is arranged) and can therefore not even reach the guide path.

In the following, the invention will be described in principle more fully by way of example with reference to the drawings.

DESCRIPTION OF THE PREFERRED EMBODIMENTS

Figure 1:
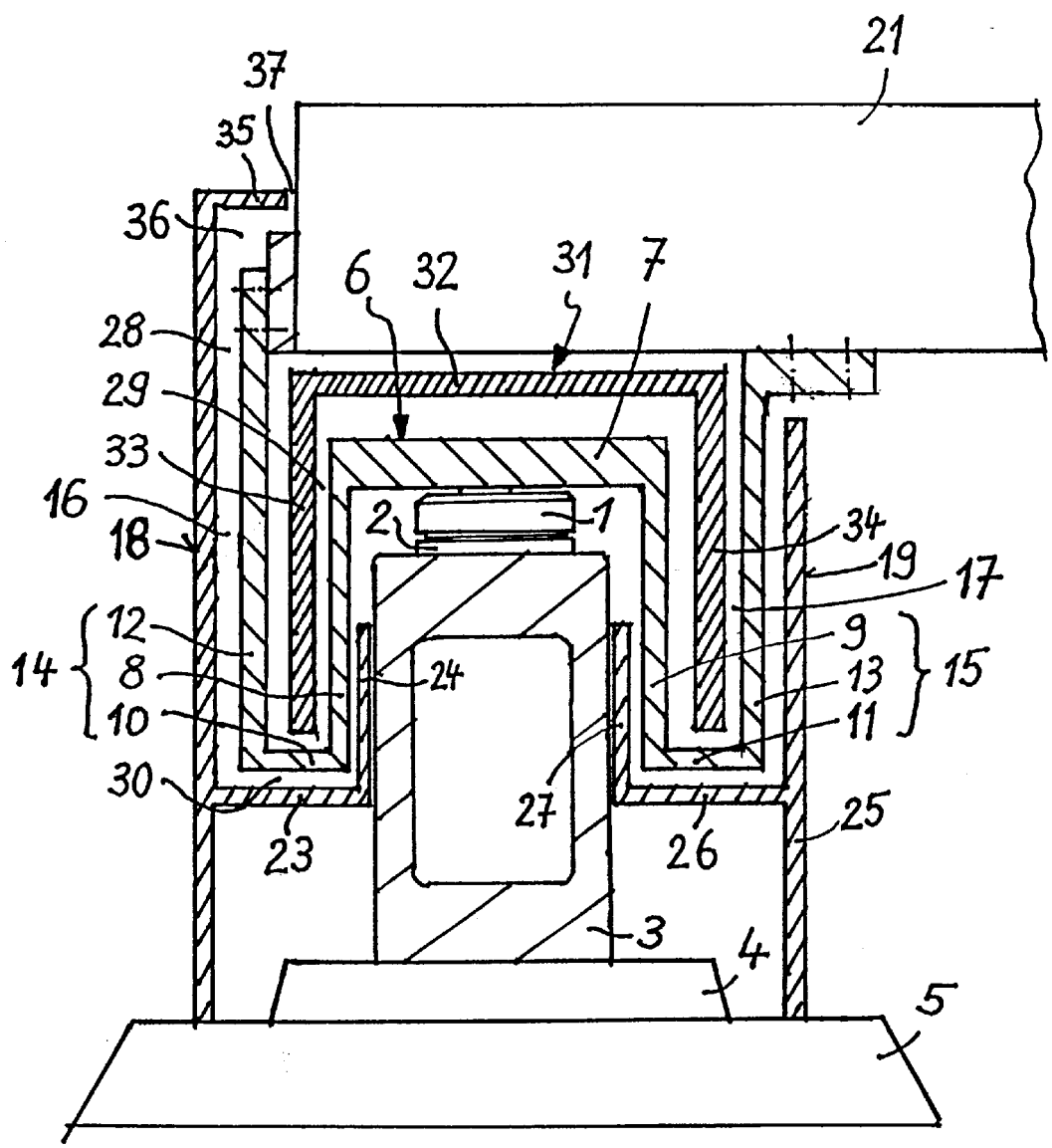
FIG. 1 shows a schematic cross section through a seal arrangement according to the invention.

FIG. 1 shows a cross section through a seal arrangement which serves to seal a bearing 1 constructed as an air bearing relative to external surroundings.

The bearing 1 is supported on a guide path which is arranged in turn on a carrying body 3 which is constructed as a hollow section carrier and extends along the length of this carrying body 3.

The carrying body 3 is supported along its length via two or more carrying webs 4 lying transverse to its longitudinal extension on a machine base body 5, only suggested in FIG. 1, of a coordinate measuring device.

The bearing 1 is connected on its upper side (located opposite the guide path 2) with a bearing cover which is designated generally by 6.

The bearing cover 6 has a transverse web 7 which is arranged above the bearing 1 and which lies above the bearing 1 parallel to the guide path 2 and extends far enough on both sides of the bearing 1 to span both the guide path 2 and the carrying body 3 laterally.

At its two lateral end regions, the transverse web 7 of the bearing cover 6 passes into a side portion 8, 9 which is bent by 90 degrees, wherein the side portions 8, 9 are bent toward the side on which the carrying body 3 is located, that is, downward with reference to the view in FIG. 1. At its lower end, each side portion 8, 9 passes into an intermediate web 10, 11 which extends at a right angle thereto toward the outer side (namely, directed away from the carrying body 3) and which, at its outer end, passes into an outer web 12 and 13, respectively, which is bent 90 degrees relative to it. The outer webs 12, 13 extend parallel to the respective side legs 8, 9 and then back toward the top at a distance thereto so as to be offset toward the outer side, so that the side leg 8, intermediate web 10 and outer web 12 and the side leg 9, intermediate web 11 and outer web 13 together form a side portion 14 and 15, respectively, of the bearing cover 6, each on one side of the carrying body 3, which side portion 14 or 15 is U-shaped in cross section.

Figure 2:
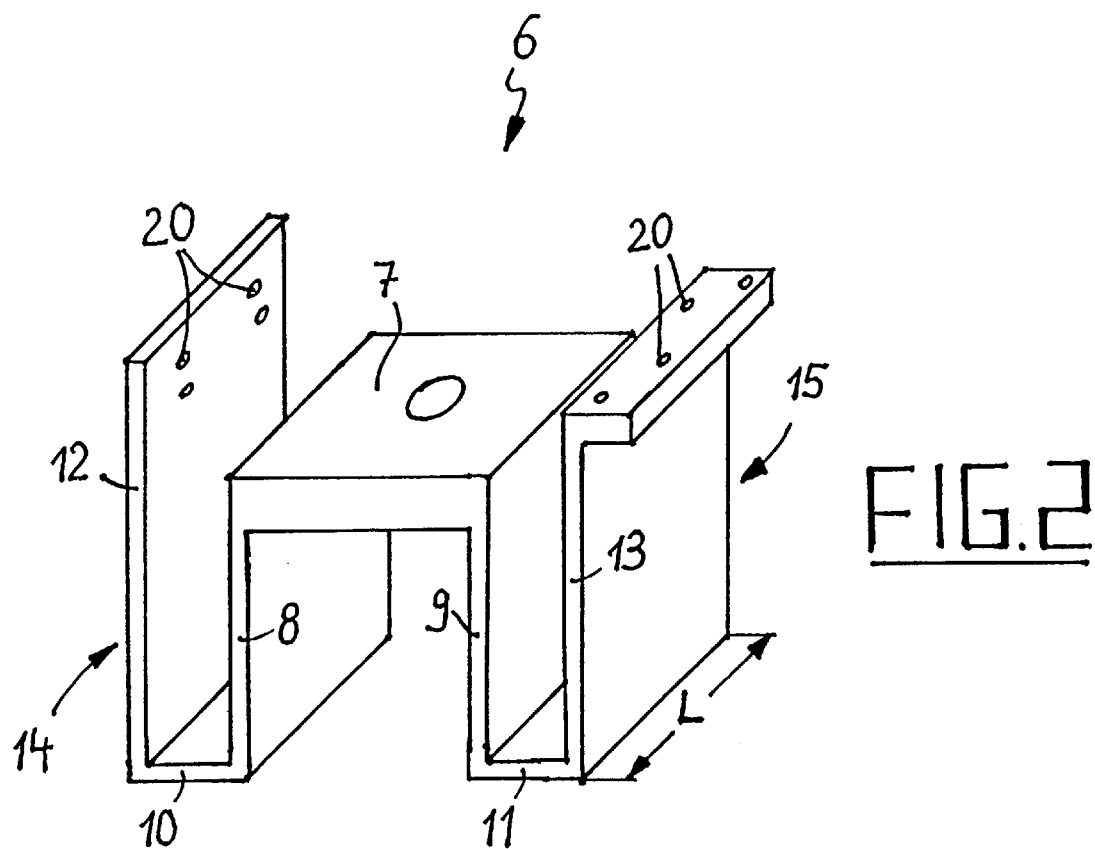
FIG. 2 shows a perspective schematic view of the bearing cover (as individual structural component part) which is used in the arrangement in FIG. 1.

FIG. 2 shows a perspective schematic view of the overall shape of the bearing cover 6 (by itself, without other parts). The bearing cover 6 shown here is manufactured in one piece from a suitable sheet metal shape. It could also be formed from a cast part, e.g., a cast alloy, or from a plurality of interconnected individual parts (this is not shown in the Figures) which are fastened to one another and which ultimately result in the shape shown herein.

The bearing cover 6 extends in the longitudinal direction of the guide path 2 only along a length L which is sufficient to cover the bearing 1 satisfactorily in this direction as well.

As is shown in FIGS. 1 and 2, the outer webs 12 and 13 extend from the respective associated intermediate web 10 and 11 essentially so as to be bent at right angles relative thereto toward the side on which the transverse web 7 of the bearing cover 6 or (in the installed state) the bearing 1 is located and their length extends appreciably beyond the surface of the transverse web 7 and the position level of the bearing 1 until they both project over the top of the bearing 1.

Every outer web 12 and 13 is suitably connected at its end region (only suggested in a purely schematic manner in FIGS. 1 and 2 by fastening holes 20) with a structure to be supported. This structure, shown only schematically in FIG. 1 and designated in general by reference number 21, is formed in the present case concerning a coordinate measuring device, e.g., from a bridge spanning a measurement base (bridge measuring device) on which a cross slide rest (not shown in the Figure) is guided so as to be movable and carries a vertically movable tailstock sleeve or spindle sleeve (also not shown in the Figure) which is provided at its lower end, e.g., with a sensing head (not shown) for detecting the dimensions of a workpiece.

The bearing cover 6 projects by its side portions 14, 15 into labyrinth openings 16 and 17 which are constructed so as to be essentially U-shaped in cross section and which are formed in each instance by a profile form or section shape 18, 19. Every section shape 18, 19 is suitably fasted to the machine base body 5, wherein the fastening itself is not shown in detail in FIG. 1.

Figure 3:
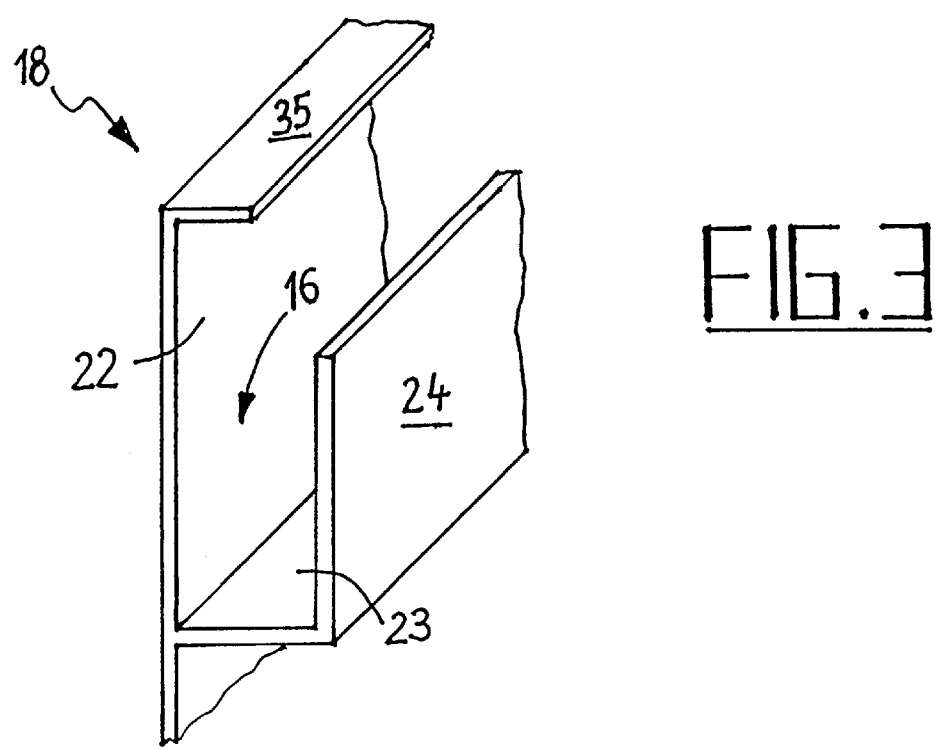
FIG. 3 shows a perspective schematic view of the upper portion of the shaped section (as structural component part) used in the arrangement of FIG. 1 to form the labyrinth recess.

FIG. 3 shows a perspective partial view of the section shape 18 shown on the left-hand side of FIG. 1.

The section shape 18 is formed of a sheet metal shape and has, on the outer side, an outside leg 22 which extends essentially vertical to the machine base body 5 and parallel to the side surface of the carrying body 3; a transverse leg 23 projects at a right angle from the outside leg 22 in the direction of the carrying body 3 and in the vicinity of the associated side wall of the carrying body 3 passes again into an inside leg 24 which is directed upward at a right angle. The outside leg 22, transverse leg 23 and inside leg 24 form a labyrinth recess 16 which is U-shaped in cross section and in which, as is shown in FIG. 1, the side portion 14 of the bearing cover 6 projects in such a way that the intermediate web 10 inside the labyrinth recess 16 lies at a distance from the transverse leg 23 of the labyrinth recess 16 parallel to the latter.

In a completely identical manner, the section shape 19 on the opposite side of the sealing arrangement has an outside leg 25 from which a transverse leg 26 projects at right angles in the direction of the carrying body 3, this transverse leg 26 passing at its end into an inside leg 27 which extends upward directly adjacent to the associated side surface of the carrying body 3. Also, a labyrinth recess 17 which is U-shaped in cross section is formed by the outside leg 25, the transverse leg 26 and the inside leg 27 of this section shape 19, wherein the side portion 15 of the bearing cover 6 located on this side projects into the labyrinth recess 17 in the same way as on the opposite side. Here also the intermediate web 11 forming the lower end surface of the side portion 15 is arranged at a distance from the transverse leg 26 of the section shape 19, which transverse leg 26 extends parallel to the intermediate web 11 and forms the base of the labyrinth recess 17.

The respective open side of the U-shaped cross section of the side portions 14 and 15 faces in a direction away from the base of the associated labyrinth recess 16 and 17, namely, toward the top with reference to the view in FIG. 1.

When each side portion 14,15 is introduced into the associated labyrinth recess 16, 17, it forms together with the latter a labyrinth seal in which the labyrinth channels which open into the labyrinth from the top and outside and finally into the interior surrounding the bearing 1 form a winding channel guide with two labyrinth channels 28 and 29 extending parallel to one another and a connection channel 30 extending transverse (that is, at right angles) to both. A completely identical construction is located on the opposite side.

Finally, as is shown in FIG. 1, a guide path cover 31 is provided between the upper side of the bearing cover 6 or its transverse web 7, which faces away from the bearing 1, and the underside of the structure 21 to be supported. As can be seen from FIG. 1, this guide path cover 31 has a U-shaped overall cross section opening downward: the latter comprises a transverse portion 32 which is located at the top and which extends parallel to and above the upper side of the transverse web 7 of the bearing cover 6, laterally spans the transverse web 7 and then passes into two side portions 33, 34 which are bent at right angles to it and which extend downward in the interior of the U-shaped recess, which is formed by the side portion 14 and 15 on each side, parallel to its respective side leg 8, 9 and to the associated outside web 12 and 13, respectively. The free end of each side portion 33 and 34, respectively, ends in turn at a distance from the intermediate web 10 and 11 of the respective side portion 14 and 15. Also, each side portion 33 and 34 projects into the U-shaped receiving space of the associated side portion 14 and 15 of the bearing cover 6 in such a way that there is a gap between each side portion 33, 34 and the two side surfaces of the side leg 8, 9 and outside leg 12,13 which face it. Every side portion 33, 34 of the guide path cover 31 is preferably arranged approximately in the middle in the U-shaped receiving space of the respective side portion 14, 15 of the bearing cover 6.

The guide path cover 31 extends over the entire length of the guide path 2 and is suitably fastened by both its ends to the machine base frame 5 or to a holder (not shown in the drawing) which is mounted thereon.

The arrangement shown in the drawing allows the guide path 2 to be covered over its entire length toward the outside by the guide path cover 31, while, at the same time, due to the shown arrangement of the bearing cover 6 with its U-shaped side portions 14, 15 which are open toward the top, it is also possible for the bearing cover 6 to be guided out of the region covered by the guide path cover 31 on the outer side of the arrangement and for a connection to be made to the supported structure 21 by guiding back toward the top.

The shown arrangement of the U-shaped cross sections of the guide path cover 31, the side portions 14 and 15 of the bearing cover 6 and labyrinth recesses 16 and 17 which do not contact one another but which alternately engage one inside the other enables an effective sealing of the interior space of the bearing cover 6 enclosing the bearing 1 and guide path 2 relative to the outer side of the entire arrangement, wherein, at the same time, the bearing cover 6 not only functions as a component part of the labyrinth seal engaging around it so as to contribute to the sealing, but also functions to transmit force between the structure 21 to be supported and the associated bearing 1.

As is shown in FIG. 1 and FIG. 3, the outside leg 22 of the section shape 18 located on the left-hand side (that is, on the outer side of the coordinate measuring device) has, at its upper side, an end region 35 which extends roughly at a right angle towards it in the direction of the structure 21 to be supported and which extends along the entire length of the section shape 18 and which ends with its free end at a short distance before the associated side surface of the structure 21. In this manner, there is an additional seal relative to the outer side in the area of the bearing location of the bearing 1 toward the top because, at the top, penetration into the interior space 36 formed between the section shape 18 and the structure 21 to be supported can only take place via this narrow gap 37 and is accordingly considerably hindered.

Insofar as dirt particles or the like, for example, enter from this space 36 into the outer, vertically upwardly extending labyrinth channel 28 of the labyrinth seal formed by the section shape 18 and the side portion 14 projecting into the section shape 18, they are guided with the air flowing inside the latter in the longitudinal direction of the channel to the lower transverse channel 30. The gas flow or air flow flowing in the channel 28 is deflected at right angles into the transverse channel 30 and must be deflected again at right angles at its opposite end in order to be able to enter the labyrinth channel 29 running upward. Since the dimensions of the cross sections are selected in such a way that the channel cross sections of the labyrinth channels are very small, there takes place a very considerable reduction in the velocity of the air flowing in the labyrinth channels from the inlet to the outlet, wherein the twofold right-angle deflection in connection with the gravitational force which is also in effect causes most of the particles and dirt particles which may be present in the air to settle in the transverse channel 30 on top of the transverse leg 23 of the section shape 18. In this way, the precipitated particles collect on the bottom of the labyrinth recess 16 (completely identical to the situation on the opposite side); in addition, the transport of very small particles which may nevertheless still be present in the labyrinth channel 29 is again impeded by the necessity of an upward flow of air in the internal labyrinth channel 29 since the gravitational force also acts on the particles in the opposite direction.

Since, as can be seen in FIG. 1, the upper end of the inside leg 24 of the section shape 18 ends at a distance below the upper surface of the carrying body 3 on which the guide path 2 is arranged, very small particles which may nevertheless still be present in the air flowing in the inner channel 29 are deposited after exiting from this channel in the channel cross section which is then widened (until reaching the upper closing surface of the carrying body 3), that is, directly above the upper edge of the inside leg 24 and do not even reach the guide path 2.

In addition, the utilized air bearing 1 always blows out some air in the opposite direction, which counters the penetration of particles from the inner labyrinth channel 38, which is directed upward at right angles, into the space surrounding the bearing 1.

The shown arrangement results in an excellent sealing of the interior space arranged around the bearing 1 and the guide path 2 inside the guide path cover 31 relative to the outside; the utilized labyrinth seal works so as to be entirely free from contact and, because of the special shaping of the bearing cover 6 and its simultaneous function as force-transmitting structural component part, can carry out a problem-free load carrying of the structure 21 to be supported via the bearing I on the guide path 2.

The dimensioning of the labyrinth channels and gaps which would otherwise occur between the individual parts can be carried out at any time in such a way that a sufficiently good sealing can be achieved over very small channel cross sections, but a completely contactless operation of the shown arrangement comprising seal and bearing I is provided. Accordingly, this arrangement operates in a frictionless manner, which is an inestimable advantage with respect to its use in measurement instruments which operate with high precision.

Due to the narrow channel widths that can be selected it is also ensured that the gaps which are located—viewed in the longitudinal direction of the guide path 2—in front of and behind the bearing cover 6 covering the bearing and which gaps are likewise present in the movement direction, do not substantially influence the overall sealing effect.

The arrangement shown in the drawings in which the main channels of the labyrinth seal extend at right angles to the plane of the guide path 2 and the guide path cover 6 can project downward appreciably below the surface of the supporting body 3 results on the whole in the possibility of the extremely advantageous seal arrangement shown in the Figures which is simple to assemble and produce and which is nevertheless extremely effective.

The residual dirt settling on the bottoms of the labyrinth recesses 14 and 15 can easily be cleaned at any time without difficulty outside the area covered by the bearing cover 6, since the labyrinth recesses 16 and 17 are easily accessible from above in these areas outside the bearing location.

Figure 4:
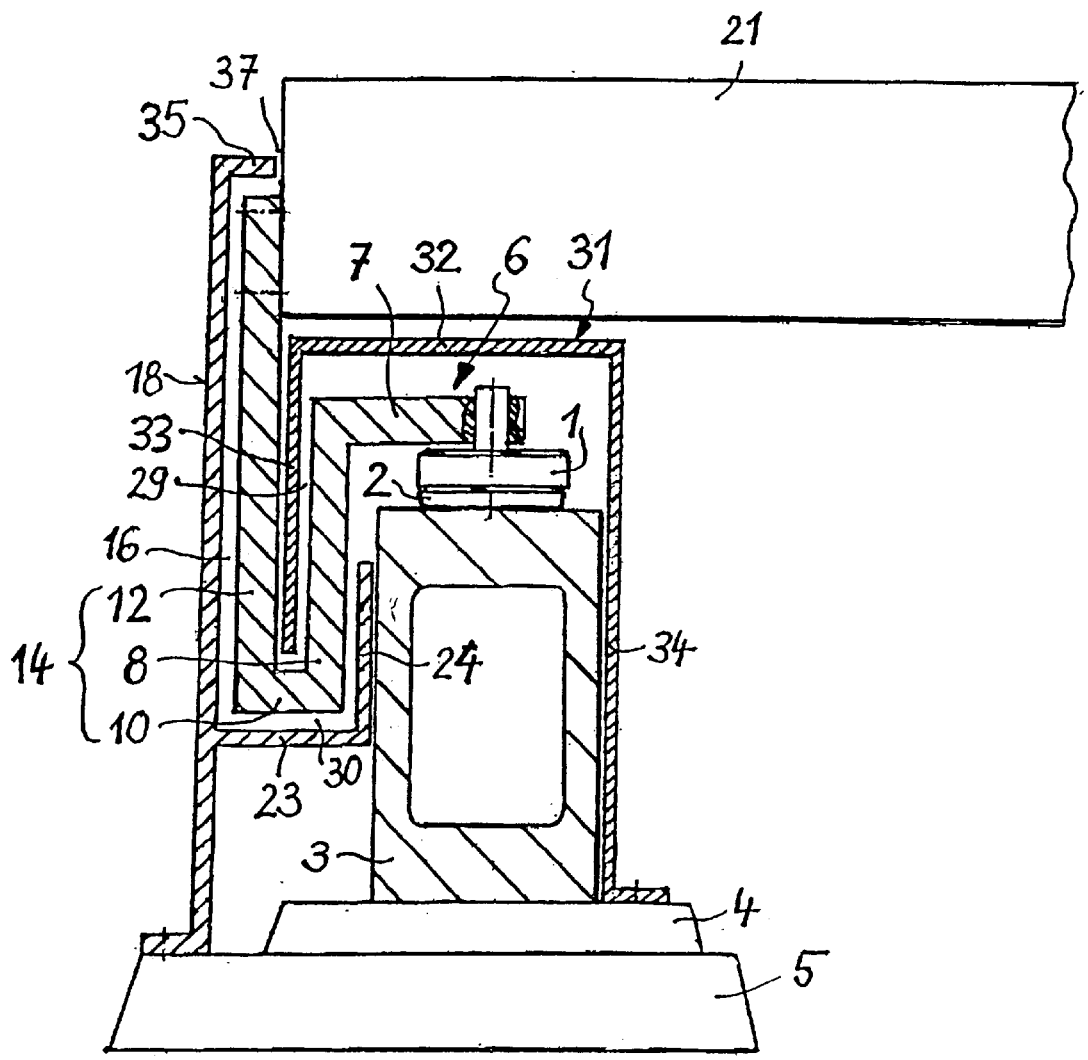
FIG. 4 shows a schematic cross section through another embodiment form of a seal arrangement according to the invention.

FIG. 4 is a schematic sectional view of another embodiment example of a sealing arrangement. It differs from the embodiment example in FIG. 1 essentially in that the bearing cover 6 in this case only covers or projects over the carrying body 3 on one side, namely, on the left-hand outer side shown in the Figure, and has a bent side portion 8 only in that location. In other respects, the structural arrangement on this bearing side corresponds essentially to FIG. 1, wherein reference is had to the description pertaining to FIG. 1.

In this case, the guide path cover 31 extends on the opposite side of the bearing 1 in such a way that the side portion 34 of the guide path cover does not project into a labyrinth recess of a side portion of the bearing cover 6 but, instead—as is shown in FIG. 4—runs down to the carrying web 4 so as to directly contact the corresponding side surface of the carrying body and is fastened to the carrying web 4. Accordingly, one bearing side (the bearing side located on the inside in FIG. 4) is completely covered and sealed by the guide path cover 34, so that the labyrinth seal is formed only on the other side.

In this case, also, the bearing cover is again a force-transmitting structural component part which transmits the weight of the structure 21 to be supported through the winding course of the labyrinth construction to the upper side of the bearing 1 for supporting.

Although the drawings show a parallel arrangement of the labyrinth channels and of the surfaces—facing one another—of the parts engaging one inside the other, a different shape of the channel cross sections can also be selected if desired, although this is not shown in the Figures. For example, by means of a corresponding shaping of the legs of the individual parts, which legs are located one inside the other or next to one another, it is possible to achieve a channel width which converges in the flow direction of the labyrinth channels from the outside toward the inside, in order to make it more difficult for air or gases to flow through the surrounding space of the bearing 1 or guide path 2. However, the use of rectangular U-shaped receiving cross sections, bends oriented at right angles to one another at the individual parts, and constant wall thicknesses brings about the great advantage that the individual parts can accordingly be produced from sheet metal shapes with constant thickness, for example.

Since the described bearing and sealing arrangement contains no longitudinal guiding of the bearing 1, it is self-evident that the guide which is likewise required for the movement of this bearing along the guide path 2 must be arranged at another location in the overall device.

While the foregoing description and drawings represent the preferred embodiments of the present invention, it will be obvious to those skilled in the art that various changes and modifications may be made therein without departing from the true spirit and scope of the present invention.

What is claimed is:

1. A seal arrangement for a load-carrying bearing comprising:

a guide path bearing for supporting said load carrying bearing being provided on a carrying body, said load-carrying bearing being arranged so as to be movable along the length of the guide path bearing, for coordinate measuring devices; and a bearing cover to which said load carrying bearing is connected;

said bearing cover spanning the carrying body at least on one side thereof and having a side portion which is bent toward its side, each such side portion projecting into a labyrinth recess structure which is arranged on the associated side of the carrying body over the entire length of the guide path bearing to form a labyrinth seal.

2. Tho seal arrangement according to claim 1, wherein side surfaces of the carrying body and side portions of the bearing cover extending essentially at right angles to a surface of the guide path.

3. The seal arrangement according to claim 1, wherein each bent side portion has a construction that is U-shaped in cross section by which it projects into the associated labyrinth recess.

4. The seal arrangement according to claim 3, wherein the closed end of the U-shaped cross section of every side portion is located in the labyrinth recess.

5. The seal arrangement according to claim 4, wherein the guide path is spanned along its entire length by a guide path cover which is U-shaped in cross section and which covers the beaming cover and its side portions and projects into the recess of the U-shaped cross section of the associated side portion of the bearing cover in the area of the bearing with each of their side legs, and wherein the lateral outside leg of the U-shaped cross section of each side portion is lengthened beyond the level of the middle leg of the U-shaped guide path cover and is connected in that location with a structure which is to be supported by the bearing.

6. The seal arrangement according to claim 5, wherein every labyrinth recess is formed of a shaped section which is arranged at the side of the carrying body.

7. The seal arrangement according to claim 6, wherein the shaped section and the carrying body are attached to a machine base body.

8. The seal arrangement according to claim 6, wherein the labyrinth recess formed by the shaped section is lengthened on its side remote of the carrying body beyond the free end of the outside leg of the side portion engaging therein and is provided at its end with an end region which is bent toward the structure to be supported by the bearing.

9. The seal arrangement according to claim 6, wherein the shaped section is constructed as a one-piece sheet metal shape.

10. The seal arrangement according to claim 6, wherein the shaped section has, on its side facing the carrying body, a side leg which is essentially parallel to the side surface of the carrying body and which extends in the direction of the guide path but ends at a distance before its position level.

11. The seal arrangement according to claim 10, wherein the shaped section contacts the side surface of the carrying body facing it by its side leg.

12. The seal arrangement according to claim 1, wherein the bearing cover with its side portions is constructed as a one-piece sheet metal shape.

13. The seal arrangement according to claim 1, wherein the bearing is constructed as an air bearing.

* * * * *